(12) United States Patent
Sapunova et al.

(10) Patent No.: US 9,681,173 B2
(45) Date of Patent: Jun. 13, 2017

(54) METHOD OF AND SYSTEM FOR PROCESSING A USER REQUEST FOR A WEB RESOURCE, THE WEB RESOURCE BEING ASSOCIATED WITH SEQUENTIALLY SEMANTICALLY LINKED DOCUMENTS

(71) Applicant: YANDEX EUROPE AG, Lucerne (CH)

(72) Inventors: Nina Viktorovna Sapunova, Novosibirsk (RU); Evgeny Valeryevich Eroshin, Magnitogorsk (RU); Ekaterina Vladimirovna Rubtcova, Voronezh (RU); Maksim Pavlovich Voznin, Chelyabinsk (RU); Grigory Aleksandrovich Matveev, Moscow (RU); Nikita Alekseevich Smetanin, Ekaterinburg (RU)

(73) Assignee: YANDEX EUROPE AG, Luzern (CH)

( * ) Notice: Subject to any disclaimer, the term of this patent is extended or adjusted under 35 U.S.C. 154(b) by 0 days.

(21) Appl. No.: 14/873,750

(22) Filed: Oct. 2, 2015

(65) Prior Publication Data
US 2016/0165298 A1 Jun. 9, 2016

(30) Foreign Application Priority Data

Dec. 3, 2014 (RU) .................................. 2014148713
May 27, 2015 (WO) .................. PCT/IB2015/053973

(51) Int. Cl.
*H04H 60/32* (2008.01)
*H04N 21/431* (2011.01)
(Continued)

(52) U.S. Cl.
CPC ....... *H04N 21/4312* (2013.01); *H04N 21/251* (2013.01); *H04N 21/44204* (2013.01);
(Continued)

(58) Field of Classification Search
CPC ............ H04N 21/4312; H04N 21/482; H04N 21/4826; H04N 21/6125; H04N 21/6582
(Continued)

(56) References Cited

U.S. PATENT DOCUMENTS 5,659,790 A * 8/1997 Kim ................... H04N 7/17336
345/475
8,170,119 B2 5/2012 Bahn
(Continued)

FOREIGN PATENT DOCUMENTS

CN 104023263 A 9/2014
EP 1705584 A1 9/2006
(Continued)

OTHER PUBLICATIONS

International Search Report from PCT/IB2015/053973, Thomas, Shane, Oct. 9, 2015.
(Continued)

*Primary Examiner* — Nathan Flynn
*Assistant Examiner* — Alfonso Castro
(74) *Attorney, Agent, or Firm* — BCF LLP

(57) ABSTRACT

There are discloses a method of and a server for processing a user request for a web resource, the user request received at a server from an electronic device via a communication network. The method can be executed at the server. The method comprises: determining that the web resource comprises a plurality of sequentially semantically linked documents that are potentially responsive to the user request; determining a particular document of the plurality of sequentially semantically linked documents, the particular document being one that the user has completed using, the determination that the user has completed using the particular document being executed by means of: determining that the user has reached an end of the particular document; and
(Continued)

if the user has not reached the end of the particular document, determining that the user has reached a pre-determined usage threshold within the particular document; generating a suggest to be displayed to the user on the electronic device, the suggest including a sequentially next document after the particular document.

24 Claims, 5 Drawing Sheets

(51) Int. Cl.
*H04N 21/482* (2011.01)
*H04N 21/61* (2011.01)
*H04N 21/658* (2011.01)
*H04N 21/84* (2011.01)
*H04N 21/25* (2011.01)
*H04N 21/442* (2011.01)
*H04N 21/4782* (2011.01)

(52) U.S. Cl.
CPC ... *H04N 21/44222* (2013.01); *H04N 21/4782* (2013.01); *H04N 21/482* (2013.01); *H04N 21/4826* (2013.01); *H04N 21/6125* (2013.01); *H04N 21/6582* (2013.01); *H04N 21/84* (2013.01)

(58) Field of Classification Search
USPC .......................................................... 725/14
See application file for complete search history.

(56) References Cited

U.S. PATENT DOCUMENTS

| | | |
|---|---|---|
| 8,365,235 B2 | 1/2013 | Hunt et al. |
| 8,561,108 B2 | 10/2013 | Bhogal et al. |
| 2004/0220926 A1 | 11/2004 | Lamkin et al. |
| 2005/0131727 A1 | 6/2005 | Sezan et al. |
| 2008/0066126 A1* | 3/2008 | Walter ............... H04N 7/17318 725/97 |
| 2009/0112817 A1 | 4/2009 | Jung et al. |
| 2009/0178083 A1* | 7/2009 | White ................. H04N 5/44543 725/61 |
| 2009/0222769 A1 | 9/2009 | Sloo |
| 2009/0228919 A1* | 9/2009 | Zott ................... H04N 7/17318 725/34 |
| 2009/0249397 A1 | 10/2009 | Bhogal et al. |
| 2009/0271706 A1 | 10/2009 | Volk |
| 2010/0122166 A1 | 5/2010 | Chien et al. |
| 2011/0016479 A1* | 1/2011 | Tidwell .................. G06Q 30/02 725/9 |
| 2012/0163771 A1 | 6/2012 | Li |
| 2012/0191542 A1 | 7/2012 | Nurmi |
| 2012/0311638 A1 | 12/2012 | Reyna et al. |
| 2013/0013372 A1* | 1/2013 | Gomez Uribe .... G06Q 30/0201 705/7.29 |
| 2014/0020119 A1 | 1/2014 | Zollinger et al. |
| 2014/0033238 A1 | 1/2014 | Jeon et al. |
| 2014/0101192 A1 | 4/2014 | Sabah et al. |
| 2014/0188866 A1 | 7/2014 | Wu et al. |
| 2014/0303785 A1 | 10/2014 | Nakai et al. |

FOREIGN PATENT DOCUMENTS

| | | |
|---|---|---|
| EP | 2138968 A1 | 12/2009 |
| RU | 2012144314 A | 4/2014 |
| WO | 03084249 A1 | 10/2003 |
| WO | 2006043925 A1 | 4/2006 |
| WO | 2014105831 A1 | 7/2014 |

OTHER PUBLICATIONS

English abstract of CN 104023263 retrieved from Espacenet on Jan. 12, 2016.

English abstract of RU 2012144314 retrieved from Espacenet on Jan. 12, 2016.

* cited by examiner

METHOD OF AND SYSTEM FOR PROCESSING A USER REQUEST FOR A WEB RESOURCE, THE WEB RESOURCE BEING ASSOCIATED WITH SEQUENTIALLY SEMANTICALLY LINKED DOCUMENTS

CROSS-REFERENCE

The present application claims priority to Russian Patent Application No. 2014148713, filed Dec. 3, 2014, entitled "METHOD OF AND SYSTEM FOR PROCESSING A USER REQUEST FOR A WEB RESOURCE, THE WEB RESOURCE BEING ASSOCIATED WITH SEQUENTIALLY SEMANTICALLY LINKED DOCUMENTS" and to International Patent Application no. PCT/IB2015/053973 filed, May 27, 2015, entitled "METHOD OF AND SYSTEM FOR PROCESSING A USER REQUEST FOR A WEB RESOURCE, THE WEB RESOURCE BEING ASSOCIATED WITH SEQUENTIALLY SEMANTICALLY LINKED DOCUMENTS" the entirety of which are incorporated herein.

FIELD OF THE TECHNOLOGY

The present technology relates to electronic communications over a communication network in general and, specifically, to a method of and a system for processing a user request for a web resource, the web resource being associated with sequentially semantically linked documents.

BACKGROUND

Users have access to a plethora of electronic devices to process various types of media content. For example, the user can use a lap top to access, using a browser, a web site to obtain information about a particular resource (for example, to read a Wikipedia article on the Berlin Wall or Ancient Greek language). The user can also access a streaming audio web site to listen to a particular audio file. The user can also access an on-line repository of video content and watch a particular video the user is desirous of watching.

Many instances of the video content are presented as a series of related episodes that are intended to be viewed sequentially, also called "series". In other words, the episodes within the given video content (i.e. video series) are sequentially semantically linked in a sense that the plot of the next episodes flows from or is otherwise linked to the previous episode (either by the story line, characters or otherwise). As such, the user who views such the video content would benefit the most from viewing the episodes in the consequential manner. Otherwise, if the given viewer misses some of the episodes (or portions of the episodes), she may not be able to understand the complete storyline.

The content of larger multi-episodes video programs is typically broken down into seasons, each season containing a certain number of episodes. For example, LOST series, originally aired by American Broadcasting Company (ABC) had 6 seasons with 121 episodes in total. When the given television network initially airs the given series, the episodes are aired one after the other (with potential re-runs or replays).

The user who follows the series can either watch the episodes in real time when they are aired or otherwise record them (using a digital recorder or a PVR) to view them at a later instance of time. Some of these series (or at least a portion thereof) are available from the aforementioned on-line repositories of on-line content at a point in time after the original airing of the series on TV. The users can access such the on-line repositories of on-line content at their leisure, browse to the desired episode and watch it using their electronic device. Typically, the on-line repositories services offer a search function, much akin to that of search engines. For example, if the user knows a particular episode of the LOST series she is willing to watch, she can type in a search query "LOST, Season 2, Episode 3" to find the particular episode that she is interested in watching.

U.S. Pat. No. 8,170,119 teaches an apparatus and a method for playing content by searching for information on the last-watched-point with respect to the content that a user watched previously, with only a selection of a file name of selected content when playing series content. The apparatus includes an information-extracting unit which extracts a series title and a program title with respect to specific content based on an electronic program guide of the series content, a control unit which generates a file name based on the extracted series title and program title, an item-generating unit which generates a content item based on the extracted series title and program title, and the generated file name, and a retrieval unit which, if the specific content is to be played, extracts a last-watched-point value by searching for information on a play point corresponding to the file name.

U.S. Pat. No. 8,561,108 provides that viewing episodes of a video series in order allows for a good viewing experience and understanding of episode content of the individual episodes. Functionality can be implemented in a video recording device and/or at a content provider to collect data about viewing behavior to determine if a user(s) tends to view episodes of a series in order. The video recording device and/or content provider can also keep track of partially or fully viewed episodes and episodes that are ready for viewing to avoid acquiring already viewed episodes Being able to quickly catch up on missed episodes will allow for easier introduction to a video series and prevent viewers from abandoning programs. In addition, requests for particular episodes can be leveraged for dynamic episode scheduling and dynamic setting of advertisement rates.

U.S. Pat. No. 8,365,235 teaches a data processing system, comprising a network interface configured to couple to a data network; one or more processors coupled to the network interface; memory coupled to the one or more processors; a video interface coupled to the one or more processors and configured to output video data to a video display device; logic encoded in one or more computer-readable media wherein execution by the one or more processors causes receiving and storing in the memory a plurality of still images from an audiovisual program, wherein each of the still images is associated with a sequentially later time point within the audiovisual program; receiving first user input specifying invocation of a trick play mode of playing the audiovisual program; generating video output to the video interface wherein the video output comprises a first image position comprising one or more of the still images, a linearly second image position comprising one of the still images, and a linearly third image position comprising one or more of the still images; wherein the still images in the video output are arranged in the image positions in sequential order according to time point within the audiovisual program; generating updated video output to the video interface in which the still image of the second image position is shifted into the first image position, one of the still images of the third image position is shifted into the second image position, and one or more new still images are in the third image position.

SUMMARY

It is thus an object of the present technology to ameliorate at least some of the inconveniences present in the prior art.

Embodiments of the present technology have been developed based on developers appreciation of at least one technical problem associated with the prior art approaches to processing user-requests for content that is associated with sequentially semantically linked documents (such as video series or other multi-episode video content or the like). When the user accesses a typical repository of video series—the user can search for content she is interested in. The system, as most search tools, provides one or more "suggests" or search query refinements, which are, typically, query completion suggestions for what the given user may be looking for.

More specifically, the presently known prior art system does not appear to take into account whether the user has completed watching a particular episode before suggesting the next episode for her to watch in the search query suggest window. Developers of the present technology have appreciated that when the user clicks a particular one of the sequentially semantically linked documents (such as a particular episode in the video series), the user may have clicked the link, watched for a few moments and then abandoned watching the content (for example, due to poor quality, the user did not enjoy the content, or got distracted with other tasks).

The developers further discovered that it would be beneficial to provide a suggest of the next sequentially semantically linked document (such as the next episode in the multi-episode video content) when the previous sequentially semantically linked document has been viewed by the user to a pre-determined threshold (i.e. length) thereof.

According to a first broad aspect of the present technology, there is provided a method of processing a user request for a web resource. The user request is received at a server from an electronic device via a communication network. The method is executed at the server. The method comprises: determining that the web resource comprises a plurality of sequentially semantically linked documents that are potentially responsive to the user request; determining a particular document of the plurality of sequentially semantically linked documents, the particular document being one that the user has completed using, the determination that the user has completed using the particular document being executed by means of: determining that the user has reached an end of the particular document; and if the user has not reached the end of the particular document, determining that the user has reached a pre-determined usage threshold within the particular document; generating a suggest to be displayed to the user on the electronic device, the suggest including a sequentially next document after the particular document.

In some implementations of the method, the suggest is a first suggest of a list of suggests and wherein if the particular document has not been determined to have been completed, the method further comprises generating a second suggest being representative of the particular document, the second suggest being ranked above the first suggest.

In some implementations of the method, the suggest is a first suggest of a list of suggests, the list of suggests further includes a second suggest indicative of the particular document that has been determined to have been completed.

In some implementations of the method, the list of suggests further includes a third suggest, the third suggest being a second next consequential document after the sequentially next document after the particular document.

In some implementations of the method, the method further comprises acquiring the pre-determined usage threshold specifically selected for a type associated with the document.

In some implementations of the method, the pre-determined usage threshold is determined by calculating a heart beat.

In some implementations of the method, the method further comprises prior to receiving the user request, determining the heart beat.

In some implementations of the method, the step of determining the heart beat comprises: collecting statistical information of the users completing using documents of a type as the plurality of sequentially semantically linked documents; determining one or more time intervals of the users using the document; for each time interval, assigning a probability parameter that after the time interval, the user is deemed to have completed the document; calculating, for each time interval, an associated heart beat parameter taking into account the associated probability parameter.

In some implementations of the method, the heart beat is personalized for the user and wherein the step of determining the heart beat is executed on statistical information associated with the user.

In some implementations of the method, the statistical information is collected off-line.

In some implementations of the method, each of time interval is determined by executing the steps of: appreciating a user triggering execution of a particular document; issuing, on a periodic basis, a query to an application executing the particular document (for example, a media player playing the series video content), the query requesting the application to confirm is the user is still using the particular document; responsive to the application not confirming that the user is still using the particular document, transmitting to the server an indication of the time interval in association with a user ID. The above is particular useful in those embodiments where the browser application 108 does not have direct visibility to the media content player (i.e. in case of plug ins and the like). Naturally, in those embodiments, where the browser application 108 has visibility to the content player, the browser application 108 can directly detect the user interaction with the video content in order to determine the time interval.

In some implementations of the method, the step of determining that the web resource comprises a plurality of sequentially semantically linked documents comprises: acquiring information describing the web resource and the plurality of sequentially semantically linked documents, the information comprising: a hash value representing a title; a number of seasons; number of episodes in each of the seasons; a score associated with each of the documents.

In some implementations of the method, the score associated with each of the documents is based on a clickability parameter for each of the documents.

In some implementations of the method, the plurality of sequentially semantically linked documents comprises sequential episodes of a series video content.

According to another broad aspect of the present technology, there is provided a server. The server comprises: a communication interface for communication with an electronic device via a communication network, a memory storage; a processor operationally connected with the communication interface and the memory storage, the processor being configured to receive, via the communication interface, a user request for a web resource, the processor being further configures to: determine that the web resource comprises a plurality of sequentially semantically linked documents that are potentially responsive to the user request; determine a particular document of the plurality of sequentially semantically linked documents, the particular document being one that the user has completed using, the determination that the user has completed using the particular document being executed by means of: determining that the user has reached an end of the particular document; and if the user has not reached the end of the particular document, determining that the user has reached a pre-determined usage threshold within the particular document; generate a suggest to be displayed to the user on the electronic device, the suggest including a sequentially next document after the particular document.

In some implementations of the server, the suggest is a first suggest of a list of suggests and wherein if the particular document has not been determined to have been completed, the processor is further configured to generate a second suggest being representative of the particular document, the second suggest being ranked above the first suggest.

In some implementations of the server, the suggest is a first suggest of a list of suggests, the list of suggests further including a second suggest indicative of the particular document that has been determined to have been completed.

In some implementations of the server, the list of suggests further including a third suggest, the third suggest being a second next consequential document after the sequentially next document after the particular document.

In some implementations of the server, the processor is further operable to acquire the pre-determined usage threshold specifically selected for a type associated with the document.

In some implementations of the server, the pre-determined usage threshold is determined by calculating a heart beat.

In some implementations of the server, the processor is further operable, prior to receiving the user request, to determine the heart beat.

In some implementations of the server, to determine the heart beat, the processor is configured to: collect statistical information of the users completing using documents of a type as the plurality of sequentially semantically linked documents; determine one or more time intervals of the users using the document; for each time interval, assign a probability parameter that after the time interval, the user is deemed to have completed the document; calculate, for each time interval, an associated heart beat parameter taking into account the associated probability parameter.

In some implementations of the server, the heart beat is personalized for the user and wherein to determine the heart beat, the processor determines the heart beat based on statistical information associated with the user.

In some implementations of the server, the statistical information is collected off-line.

In some implementations of the server, the processor is configured to determine each of time interval by executing the steps of: appreciating a user triggering execution of a particular document; issuing, on a periodic basis, a query to an application executing the particular document, the query requesting the application to confirm is the user is still using the particular document; responsive to the application not confirming that the user is still using the particular document, transmitting to the server an indication of the time interval in association with a user ID.

In some implementations of the server, to determine that the web resource comprises a plurality of sequentially semantically linked documents, the processor is configured to:

acquire information describing the web resource and the plurality of sequentially semantically linked documents, the information comprising: a hash value representing a title; a number of seasons; number of episodes in each of the seasons; a score associated with each of the documents.

In some implementations of the server, the score associated with each of the documents is based on a clickability parameter for each of the documents.

In some implementations of the server, the plurality of sequentially semantically linked documents comprises sequential episodes of a series video content.

In the context of the present specification, unless specifically provided otherwise, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless specifically provided otherwise, the expression "component" is meant to include software (appropriate to a particular hardware context) that is both necessary and sufficient to achieve the specific function(s) being referenced.

In the context of the present specification, unless specifically provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
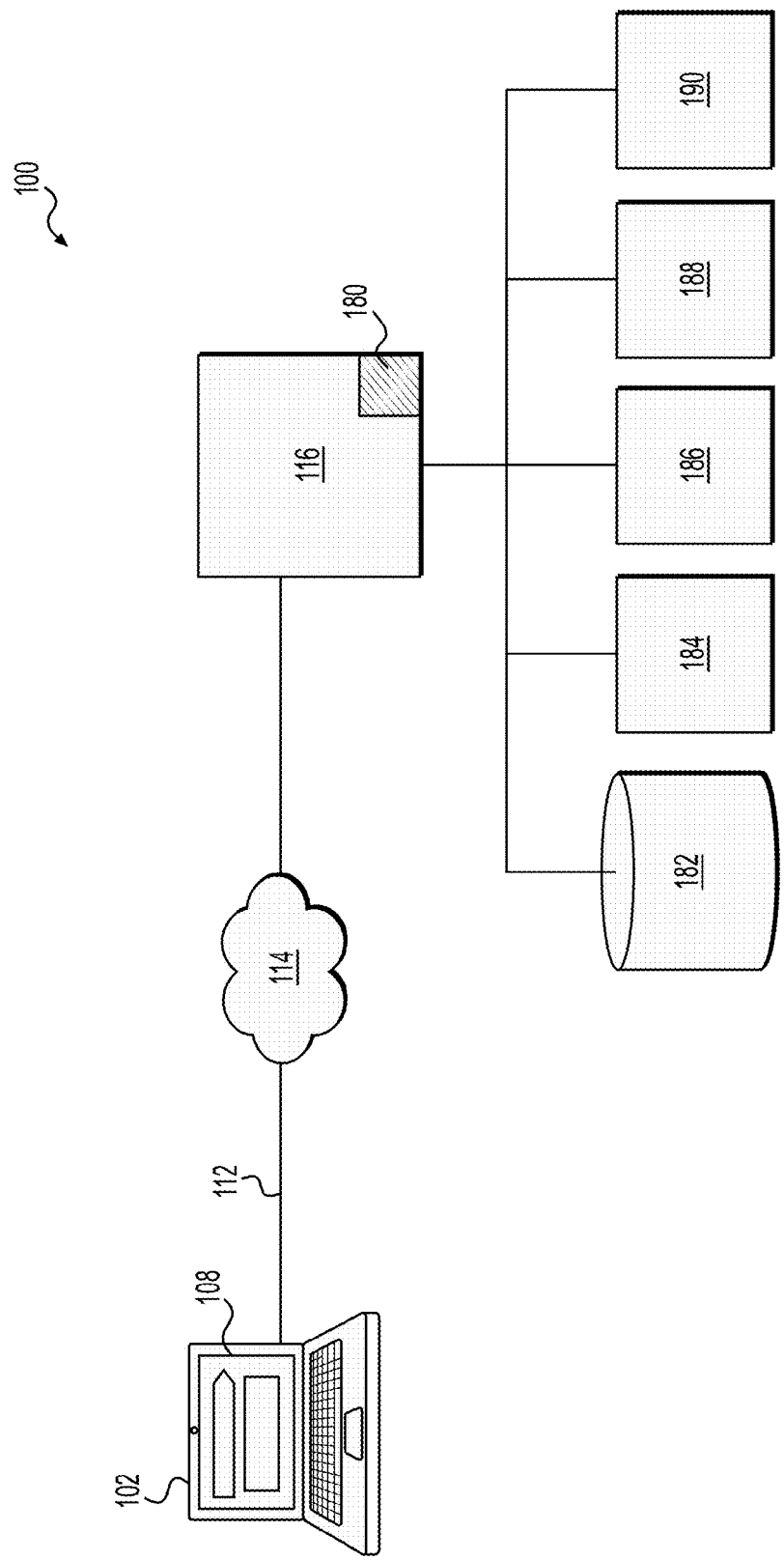
FIG. 1 is a schematic diagram of a system implemented in accordance with an embodiment of the present technology.

Referring to FIG. 1, there is shown a diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless electronic device (a cell phone, a smartphone, a tablet and the like), as well as network equipment (a router, a switch, or a gateway). Merely for the purposes of an illustration, it shall be assumed that the electronic device 102 is implemented as a laptop computer, such as LENOVO™ THINKPAD™ X220 lap top running a WINDOWS™ operating system.

The electronic device 102 comprises hardware and/or software and/or firmware (or a combination thereof) to execute a number of applications. For the purposes of illustration of the embodiments of the present technology, it shall be assumed that the electronic device 102 is configured to execute a browser application 108. The browser application 108 can be implemented as a user launching one of the many available browsers, such as: Mozilla Firefox™ browse, Google™ Chrome™ browser, a Yandex™ browser, as well as a number of additional commercial or proprietary browsers.

Irrespective of how the browser application 108 is implemented, the browser application 108, typically, has a command interface and a browsing interface. Generally speaking, a given user can access a resource on the communication network by two principle means. The given user can access a particular resource directly, either by typing an address of the resource (typically an URL or Universal Resource Locator, such as www.webpage.com) into the command interface or by clicking a link in an e-mail or in another web resource (which action will in a sense "copy and paste" the URL associated with the link into the command interface).

Alternatively, the given user may conduct a search using a search engine to locate a resource of interest. The latter is particularly suitable in those circumstances, where the given user knows a topic of interest, but does not know the exact address of the resource she is interested in. The search engine typically returns a Search Engine Results Page (SERP) containing links to one or more web resources that are responsive to the user query. Again, upon user clicking one or more links provided within the SERP, the user can open the required web resource.

Hence, the purpose of the command interface is to allow the user to type or copy-and-paste a Unified Resource Locator (URL) or, simply, an address associated with the web resource the user is looking for. The purpose of the browsing interface is to show the web resource that is hosted at the address, which URL is entered into the command interface.

Within the modern browser applications 108, the command interface is typically implemented as an "omnibox" field—the one incorporating functionality of the field for entering URLs and the field for entering search queries for the search engine associated with the browser application 108 to search. In other words, within such implementations, the user can use the command interface for both entering search queries and URLs. The browsing interface is, therefore, can be for displaying to the user either (i) a web resource associated with the URL entered into the command interface or (ii) a search results page (SERP) generated in response to the search query entered in the command interface.

The electronic device 102 is communicatively coupled to a communication network 114 via a communication link 112. In some non-limiting embodiments of the present technology, the communication network 114 can be implemented as the Internet. In other embodiments of the present technology, the communication network 114 can be implemented differently, such as any wide-area communication network, local-area communication network, a private communication network and the like.

How the first communication link 112 is implemented is not particularly limited and will depend on how the electronic device 102 is implemented. Since the electronic device 102 is implemented as a laptop, the communication link 112 can be wireless (such as the Wireless Fidelity, or WiFi® for short, Bluetooth® or the like) or wired (such as Ethernet™ based connection). In alternative embodiments, where the electronic device 102 can be implemented as a smartphone (as an example), the communication link 112 can be wireless—such as the Wireless Fidelity, or WiFi® for short, Bluetooth® or the like or cellular (such as 3G, LTE and the like).

It should be expressly understood that implementations for the electronic device 102, the communication link 112, and the communication network 114 are provided for illustration purposes only. As such, those skilled in the art will easily appreciate other specific implementational details for the electronic device 102, the communication link 112, and the communication network 114. As such, by no means, examples provided herein above are meant to limit the scope of the present technology.

Within embodiments of the present technology, there is also provided a content server 116 (also, referred to for simplicity as the "server 116"). The content server 116 can be implemented as a conventional computer server. In an example of an embodiment of the present technology, the content server 116 can be implemented as a Dell™ PowerEdge™ Server running the Microsoft™ Windows Server™ operating system. Needless to say, the content server 116 can be implemented in any other suitable hardware and/or software and/or firmware or a combination thereof. In the depicted non-limiting embodiment of present technology, the content server 116 is a single server. In alternative non-limiting embodiments of the present technology, the functionality of the content server 116 may be distributed and may be implemented via multiple servers.

The content server 116 comprises hardware and/or software and/or firmware (or a combination thereof) to execute a video content application 180. The video content application 180 can also be referred to by those of skill in the art as a "video service application".

The general implementations of the video content application 180 are known and, as such, will not be described here at much length. Suffice it to state that the content server 116 is associated with a memory storage 182, the memory storage 182 can be implemented as conventional storage device, such as one or more disk storage devices.

In some embodiments of the present technology, the video content application 180 is configured to execute a query detection module 184, a video listing module 186, a document detection module 188 and a series structure module 190.

Within some embodiments of the present technology, the components of the video content application 180 can be configured to execute the following functionality.

The Query Detection Module 184

The query detection module 184 can be configured to receive a user search request, to parse the user search request and extract one or more key words from the parsed user search request, which one or more key words are indicative of the search request being of a "series" category, or in other words associated with video content having multiple episodes.

Some examples of such one or more key words can be words or combination of words that include: episode, $N^{th}$ season, series, watch series on-line and the like. The query detection module 184 is configured to collect (off-line, for example) log information representative of one or more past queries. The query detection module 184 is also configured to collect statistical information in regard to past queries, the associated search query response(s) and the user selections from the present search query responses.

Based on the collected statistical information, the query detection module 184 is further configured to: (i) determine that the associated search query is of the series category and (ii) extract one or more words from the search query having a high potential of being the title of the requested series; (iii) store the one or more words representative of the title in the video listing module 186.

The Video Listing Module 186

Within some embodiments of the present technology, a title of a given series that the user submits as part of a user search query can be imprecise (based on the user's imprecise recollection of the title). Alternatively, the user can type the title of the series in different languages and, sometimes, in an imprecise transliteration. As such, the video listing module 186 is configured to store an indication of the title of all known and indexed series, as well as all known and potential variation of the title. These variations and alternative ways to present the title of the series in the given search query can be generated by the query detection module 184 on the basis of analysis of statistical information the query detection module 184 has collected.

In some embodiments of the present technology, the video listing module 186 can be updated, from time to time or on a periodic basis. For example, the video listing module 186 can be updated with the outdated titles being removed, with new titles being added, new alternative and synonym titles being added and the like.

For example, when a new series becomes available, let's say the series title is "North York General Hospital". Once the number of search queries has reached a certain threshold, the query detection module 184 adds the new title to the video listing module 186.

The Document Detection Module 188

The document detection module 188 is configured to access one or more web resources available via the communication network 114. In some embodiments, the document detection module 188 is configured to access only those one or more web resources that host video content.

In order to achieve that, the document detection module 188 (or another component of the video content application 180 or a dedicated content indexer, such as a web crawler of a search engine and the like) is configured to index all available resources to identify a subset of the available documents that contain video content. How the identification of the subset of the resources is executed is not limited and can be executed as lexical analysis of the resource content, semantic analysis of the resource content, based on key words that are indicative of the resource hosting video content, and the like.

The content of each of the resources identified in the subset of resources is parsed and the parsed content is compared with the entries maintained in the video listing module 186. As an example of the parsing process, the document detection module 188 analyzes the parsed content of the resource to determine: (i) words or phrases that match one or more entries within the video listing module 186, indicative of potential title of the video content and (ii) marker-words (such as "series", "episode", "season") as well as numerals located in close proximity thereto—in order to determine the season and/or episode associated with the video content hosted on the resource The Series Structure Module 190

The series structure module 190 is configured to store labelled information about series video content available within the subset of resources. In some embodiments, the labelled information is organized by the series.

As an example, for each of the series, the series structure module 190 can maintain: (i) a title (as a hash or otherwise), (ii) the number of seasons, (iii) the number of episodes within each season, (iv) a quality parameter (expressed as the click ratio or the like).

In some embodiments of the present technology, the documents representative of the series can be maintained in the series structure module 190. In other embodiments of the present technology, the documents representative of the series can be maintained in a separate storage (such as a search index, which is not depicted, or the like).

As a non-limiting example, a given file associated with a given series maintained within the series structure module 190 can be expressed as follows:

\"video_series_struct\":{\"timestamp\":1403191149,\"values\":{\ "3909547314\":{\"struct\":\"[1, 2, 3, [2, [1, 2,3, 4]]\"}}

Where the portions of the given file name can represent the following.
\"values\":{\"3909547314\"—a hash representation of the title
[1, [1, 2, 3]]—first season contains 3 episodes
[2, [1, 2, 3, 4]]—second season contains 4 episodes
Heart Beat Algorithm According to embodiments of the present technology, the video content application 180 is configured to determine that a suggestion of the next episode has to be provided responsive to a determination that a particular episode has been watched by the user (or, more broadly, that a particular sequentially semantically linked documents has been used).

In some embodiments of the present technology, the video content application 180 is configured to determine that the particular episode has been watched by the user (or, more broadly, that the particular sequentially semantically linked documents has been used) based on execution of a "heart beat" algorithm. The general concept of the heart beat algorithm is based on the premise that if the user has clicked a particular episode and has spent a comparatively low period of time watching it, the user can not be deemed to have completed watching the episode (for example, it was a wrong episode, a wrong series, the quality was not satisfactory, the user got distracted and the like). In these circumstances, the video content application 180 needs to determine that the suggest of the next episode is not appropriate.

If, on the other hand, the user has completed watching the entirety of the episode or if the user has watched the episode past a pre-determined threshold, the video content application 180 needs to determined that during the next search, the user should be suggested the next episode for watching.

According to embodiments of the present technology, the video content application 180 is configured to determine the pre-determined threshold. The video content application 180 is configured to collect statistical information in regard to viewers behaviour when watching multi-episode video content.

In some embodiments of the present technology, the statistical information comprises duration of the user watching a given video content, a user identifier associated with the user watching the given video content and the like. The video content application 180 can then analyze the duration of the users watching the given video content, in a pre-defined time chunks, such as 10 seconds, 1 minute, 5 minutes, 10 minutes, 20 minutes and the like.

The video content application 180 can then build a probability function—for each of the time intervals for which the given video content has been watched, whether or not the given video content can be considered to have been watched to completion or not.

| | |
|---|---|
| 1 min | 0.1 |
| 5 min | 0.5 |
| 10 min | 0.7 |
| 20 min | 0.9 |
| 30 min | 0.98 |

In some embodiments of the present technology, the statistical information is collected and off-line and can be updated from time to time (such as on periodic basis and the like). In some embodiments, the statistical information can be personalized to the given user. In other words, the video content application 180 can be configured to collect statistical information and to determine the heart beat information (based on the statistical analysis of the viewing patterns) for the given user.

Suggest Generation Algorithm

Within the embodiments of the present technology, the video content application 180 is also configured to generate a suggest, the suggest being generated in response to a user submitting at least a portion of a search query into a query interface of the video content application 180. As such, the user first enters at least a portion of the search query into the query interface of the video content application 180.

The at least the portion of the search query is transmitted, by the electronic device 102, to the content server 116. In some embodiments, the electronic device 102 can also transmit a user identifier, alongside with the at least the portion of the search query.

The content server 116 and, more specifically, the query detection module 184 parses the received at least the portion of the search request. The query detection module 184 parses at least the portion of the search request and, based on the information maintained in the video listing module 186, the query detection module 184 determines which series video content the user is searching for.

The content server 116 then retrieves one or more logs associated with the user, based on the user identifier to determine if the user has submitted previous searches for the same series video content. In other words, the content server 116 determines if the user search query is connected with previous search queries submitted by the user.

If the content server 116 determines that the current search query is linked to a previous search query submitted by the user, the content server 116 is configured to execute the heart beat algorithm described above to determine the last watched Season/Episode combination.

As has been described above, using the heart beat algorithm, the content server 116 can determine the last watched episode (the last watched episode being an example of a particular document of the plurality of sequentially semantically linked documents), the last watched episode being: (i) the last episode that the user watched till the very end thereof, or (ii) the user has watched till the pre-determined usage threshold within the particular episode, the pre-determined usage threshold having been determined by the heart beat algorithm described above.

The content server 116, using the video listing module 186, then determines the next episode, the episode following the completed episode. The content server 116 can then generate a suggest for the user. In some embodiments, the suggest includes (i) a title of the series, (ii) an indication of the last watched episode and the associated season, (iii) an indication of the next episode and the associated season.

The content server 116 is then configured to transmit a trigger to the electronic device 102, the trigger for causing the electronic device 102 to display the suggest to the user.

In some embodiments of the present technology, the trigger can cause the electronic device 102 to display the suggest in the following non-limiting manner.

The first line of the suggest can include an indication of the next episode, as well as an indication that the user has completed the previous episode. In some embodiments, the indication that the user has completed the previous episode can be provided in a different color than the indication of the next episode. The second line and the third lines of the suggest can include the second-next episode and the third-next episode indications. The suggest can include a number of additional lines with additional suggested episodes. Naturally, the form and the organization of the lines within the presented suggest can be different.

Figure 2:
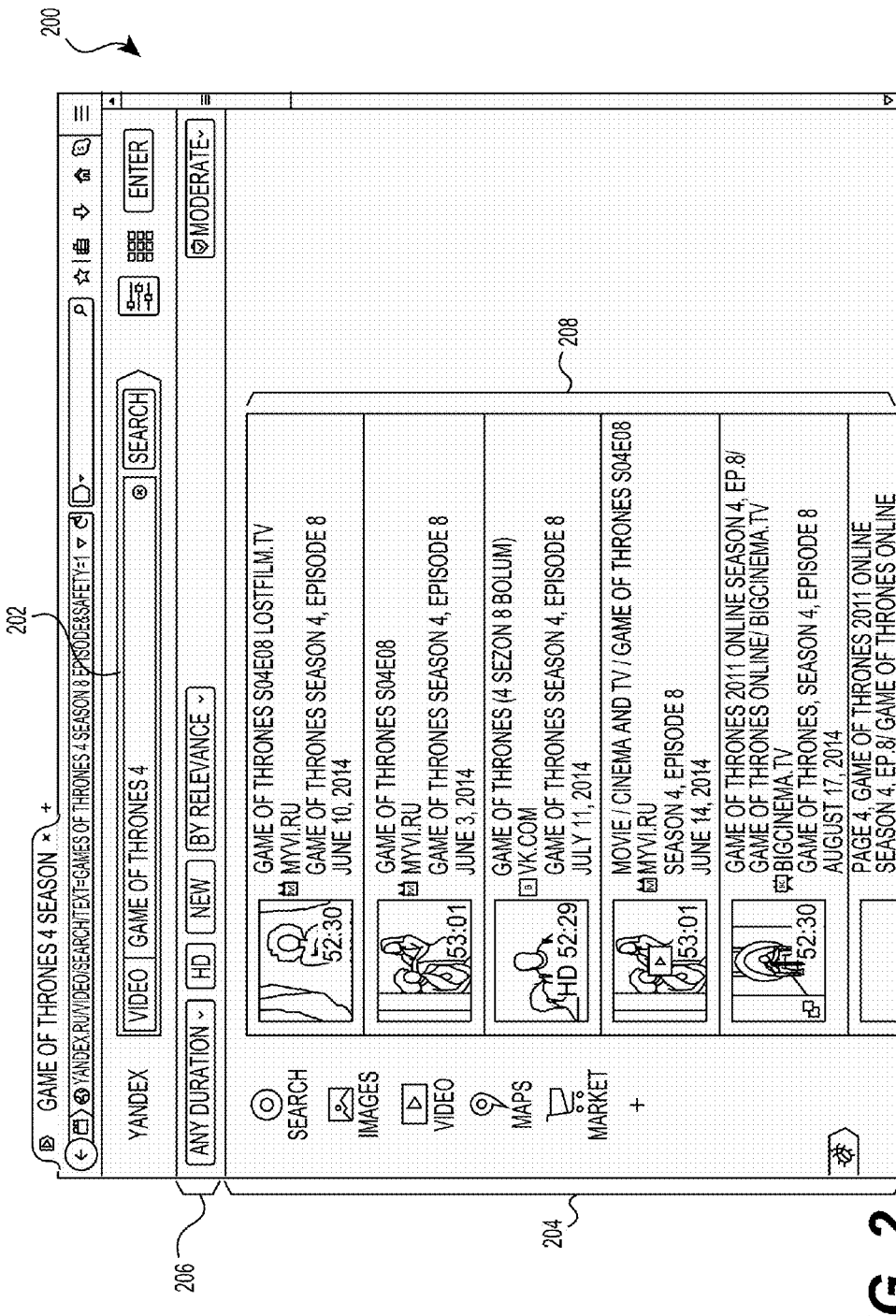
FIG. 2, there is depicted a screenshot, the screenshot depicting a typical interface of the video content application accessed through the browser application executed by the electronic device.

With reference to FIG. 2, there is depicted a screenshot 200, the screenshot 200 depicting a typical interface of the video content application 180 accessed through the browser application 208 executed by the electronic device 102.

The video content application 180 presents, to the user on a screen (not depicted) of the electronic device 102, a command interface 202, which is implemented as the aforementioned omnibox. The user can input and the electronic device 102 can receive, via the command interface 202, one or more search queries. In the depicted embodiment, the user has entered as search query "game of thrones 4".

The video content application 180 presents, to the user on the screen (not depicted) of the electronic device 102, a browsing interface 204. The browsing interface 204 displays to the user one or more search results (also known as "hits") that are responsive to the search query entered in the command interface 202. How the search results are generated are known in the art and are generally outside of the scope of this description. It is expected that those skilled in the art will be able to apply their common general knowledge to implemented the search algorithm.

In the depicted embodiment, the browsing interface 204 present a set of search results 208, the set of search results 208 displaying links and snippets associated with several series video content documents that are responsive to the search query "game of thrones 4". In the depicted illustration, the search results 208 contain 6 hits, but there can be fewer or more hits in the various implementations of the present technology.

The video content application 180 can also present a control panel 206, the control panel 206 for allowing the user to input one or more filters to limit the search results presented within the browsing interface 204. In the depicted embodiment, the control panel 206 has 4 filters: "any length", "HD", "recent" and "Sort by relevancy" (in Russian, respectively, " Любая длительность ", "HD", " Свежие " and " По релевантности "). However, the exact number and type of filters are not limited to the ones depicted herein. Also, the control panel 206 can be omitted altogether in the alternative implementations of the present technology.

The screenshot 200 depicts the video content application 108 interface, as displayed on the electronic device 102, after the user has entered and executed the search query (such as typed in the search query and hit enter). Notably, the browsing interface screenshot 200 depicts the video content application 108 interface, as displayed on the electronic device 102, after the user has been presented a suggest, the suggest having been generated in accordance with embodiments of the present technology. It is noted that the user may have selected one of the provided suggests or not.

Figure 3:
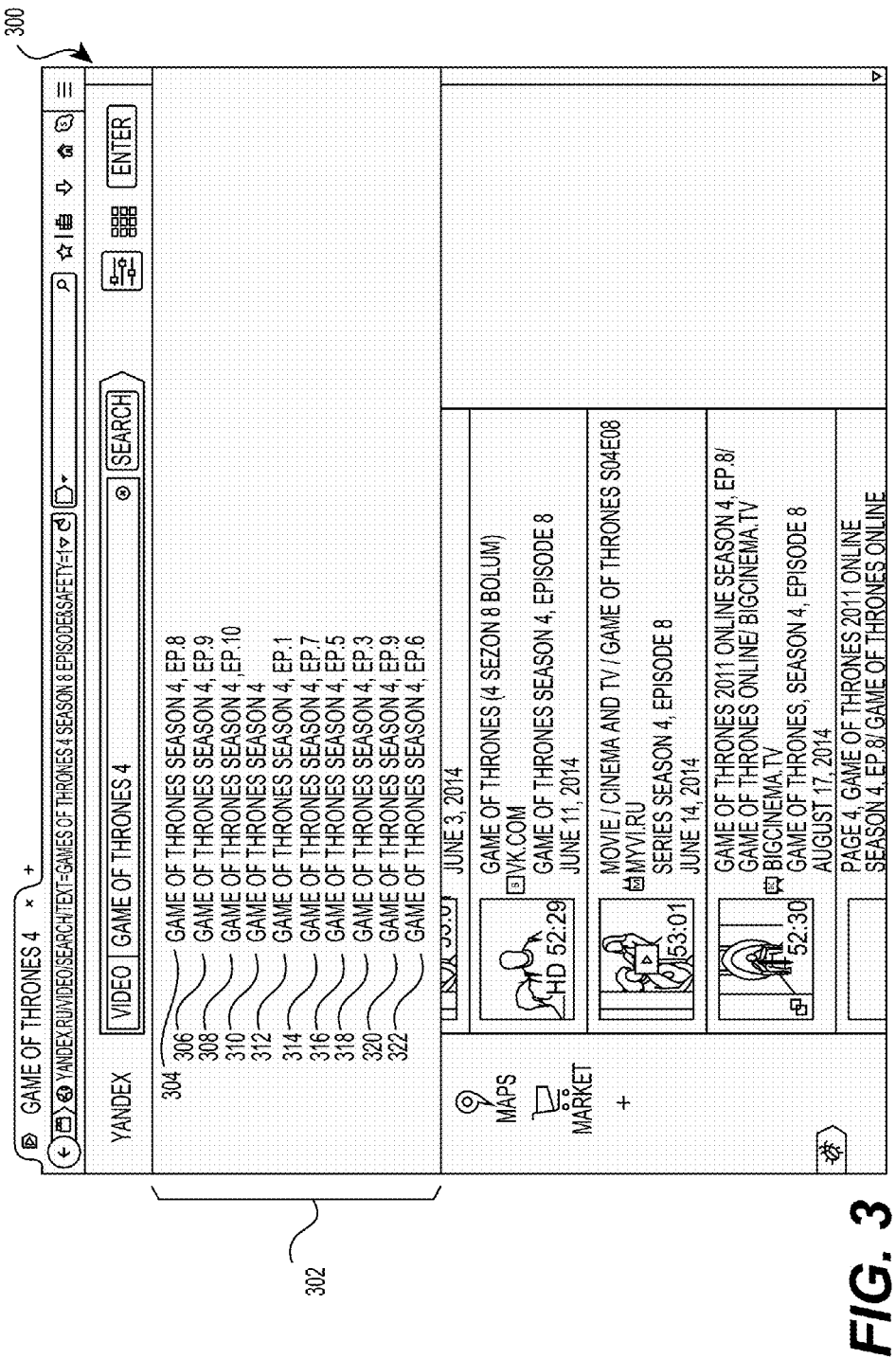
FIG. 3, there is depicted a screenshot, the screenshot depicting the typical interface of the video content application accessed through the browser application executed by the electronic device, the typical interface being depicted at a stage of presenting one or more suggests to the user.

With reference to FIG. 3, there is depicted a screenshot 300, the screenshot 300 depicting the typical interface of the video content application 180 accessed through the browser application 208 executed by the electronic device 102, the typical interface being depicted at a stage of presenting one or more suggests to the user.

Much akin to the screen shot 200, the screenshot 300 depicts the command interface 202 and the browsing interface 204 (not numbered in FIG. 3). Overlaid over at least a portion of the browsing interface 204 is a suggest field 302, the suggest field 302 for presenting one or more suggests in response to the user typing at least a portion of the search query into the command interface 202. For the avoidance of doubt, the suggest can be a query completion, the query completion being in response to the user entering a partial search query. The suggest can be in response to the complete query entered by the user, the suggest being a suggestion of the next episode to watch, the next episode to watch having been determined using algorithms and routines described herein.

Within the depicted illustration, the suggest field 302 displays ten instances of suggests: a first suggest 304, a second suggest 306, a third suggest 308, a fourth suggest 310, a fifth suggest 312, a sixth suggest 314, a seventh suggest 316, an eight suggest 318, a ninth suggest 320 and a tenth suggest 322.

For example, the first suggest 304 presents to the user the query completion "Games of Thrones $4^{th}$ season, $8^{th}$ episode". The tenth suggest 322 to the user the query completion "Games of Thrones $4^{th}$ season, $6^{h}$ episode".

Figure 5:
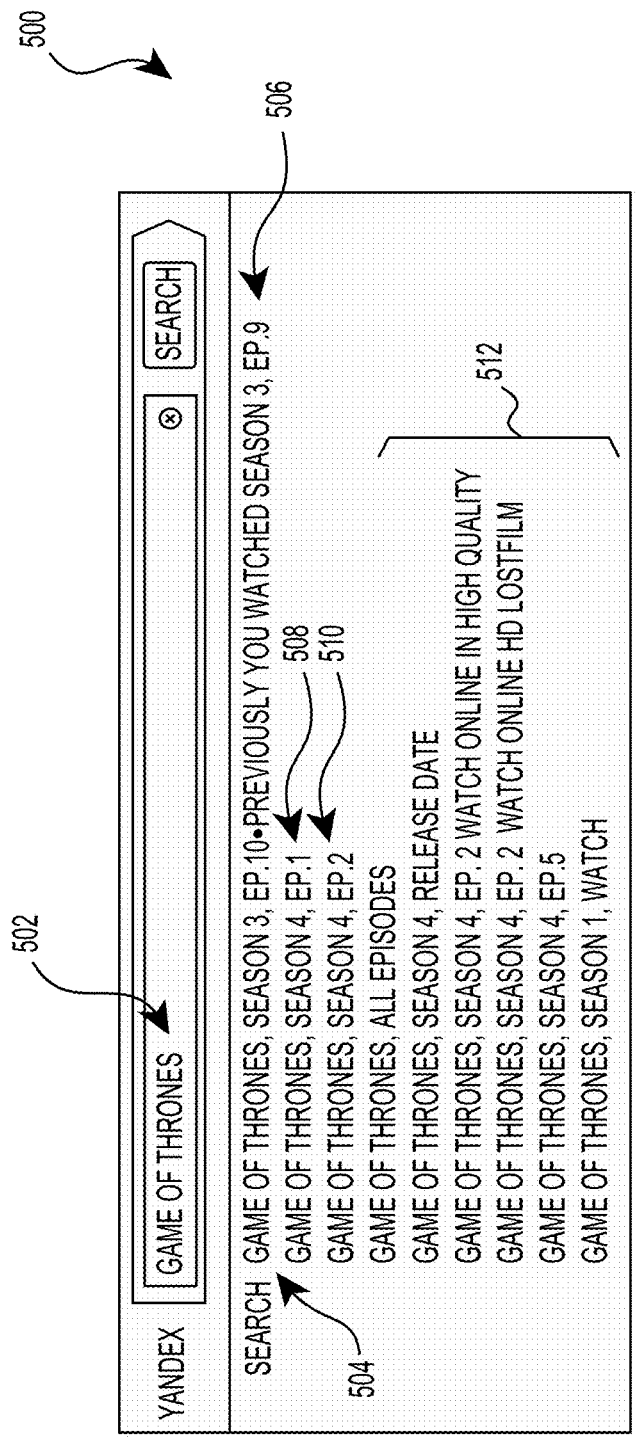
With reference to FIG. 5, there is depicted a screenshot, the screenshot depicting a portion of the interface of the video content application, the portion of the interface displaying the suggests that have been organized in accordance with embodiments of the present technology.

The suggests presented in the suggest field 302 have not been organized in accordance with embodiments of the present technology. With reference to FIG. 5, there is depicted a screenshot 500, the screenshot 500 depicting a portion of the interface of the video content application 108, the portion of the interface displaying the suggests that have been organized in accordance with embodiments of the present technology.

The screenshot 500 depicts a command interface 502 where the user has entered a partial search query "game of thrones" (In Russian: " Игра Престолов "). There screen shot 500 also depicts a suggest field (not separately numbered), the suggest field containing a first suggest 504, a second suggest 508, a third suggest 510 and a number of additional suggests 512.

The first suggest 504 can include an indication of the next episode (in this case, the next episode has been determined to be $10^{th}$ episode of the $3^{rd}$ season). The first suggest 504 can also optionally include an indication of a previously completed episode 506, the previously completed episode 506 being an indication that the user has completed the previous episode (in this case, the $9^{th}$ episode of the $3^{rd}$ season). In some embodiments, the indication that the user has completed the previous episode (the previously completed episode 506) can be provided in a different color than the indication of the next episode (the first suggest 504).

The second suggest 508 and the third suggest 510 can include the second-next episode and the third-next episode indications (in this case, the $1^{st}$ and the $2^{nd}$ episodes of the $4^{th}$ season). The suggest field can include a number of additional lines with additional suggested episodes, jointly depicted as the number of additional suggests 512.

The first suggest 504, the previously completed episode 506, the second suggest 508, the third suggest 510 and the number of additional suggests 512 have been generated using the heart beat algorithm described above and implementing the method to be described momentarily.

Naturally, the form and the organization of the lines within the presented suggest can be different.

Figure 4:
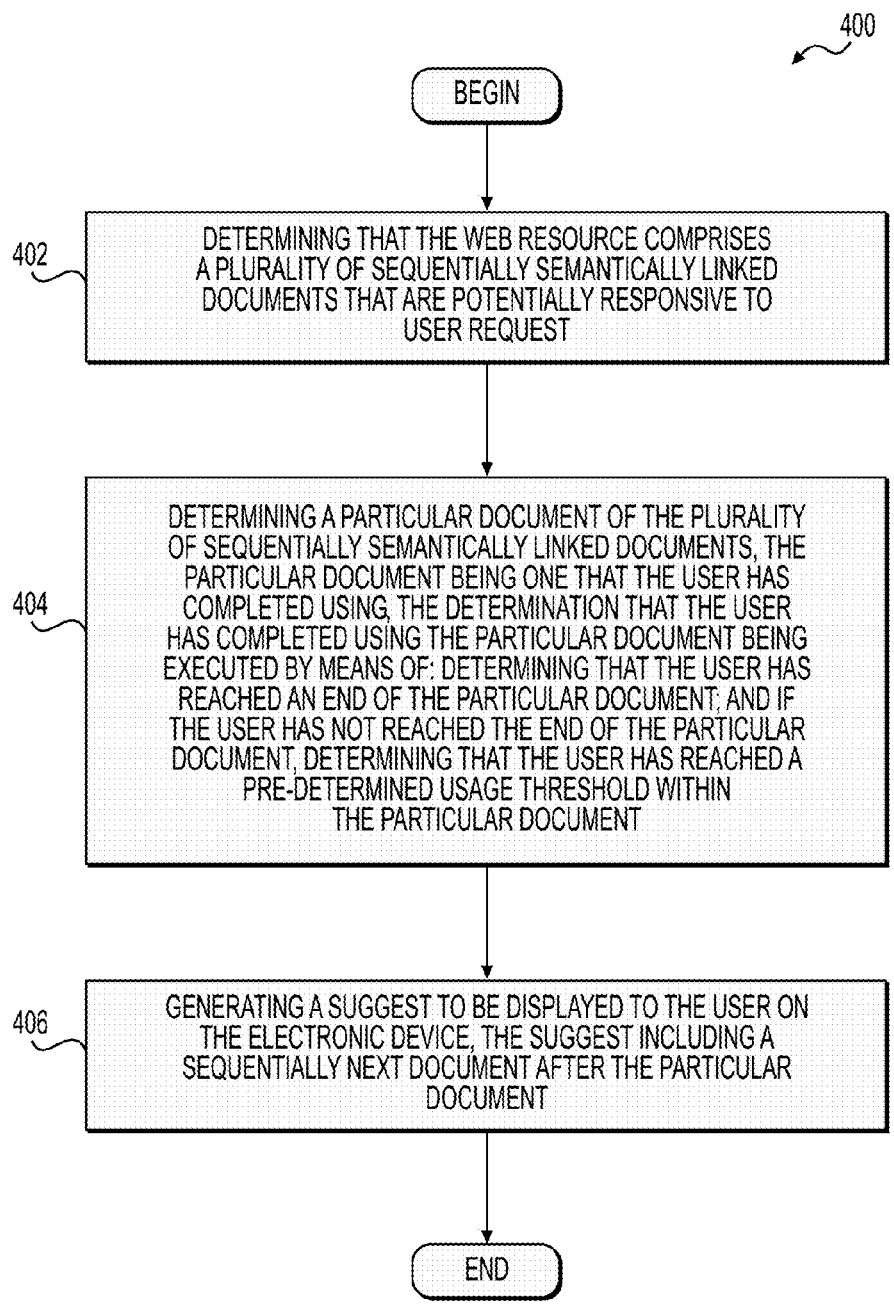
With reference to FIG. 4, there is depicted a block diagram of a method, the method being executable in accordance with non-limiting embodiments of the present technology.

Given the architecture described above, it is possible to execute a method of processing a user request for a web resource. The user request can be received at the content server 116 from the electronic device 102 via the communication network 114. The method can be conveniently executed by the server 116. With reference to FIG. 4, there is depicted a block diagram of a method 400, them method 400 being executable in accordance with non-limiting embodiments of the present technology.

It is noted that the method 400 is executed to the user typing in at least a portion (i.e. at least a part or the whole) of the search query into the command interface 202, 502. The search query is received buy the content server 116 from the electronic device 102 via the communication network 114 (in response for example, to the user hitting ENTER in case of the whole of the search query or typing in a pre-determined number of characters in case of the portion of the search query).

Step 402—determining that the web resource comprises a plurality of sequentially semantically linked documents that are potentially responsive to the user request The method 400 begins at step 402, the content server 116 determines that the web resource comprises a plurality of sequentially semantically linked documents that are potentially responsive to the user request.

In some embodiments of the present technology, executing the step of determining that the web resource comprises a plurality of sequentially semantically linked documents comprises: acquiring information describing the web resource and the plurality of sequentially semantically linked documents, the information comprising: a hash value representing a title; a number of seasons; number of episodes in each of the seasons; a score associated with each of the documents.

In some embodiments, the score associated with each of the documents is based on a clickability parameter for each of the documents.

Within some implementations of the present technology, the step of determining comprises accessing the aforementioned video listing module 186 and checking is a portion or a whole of the user entered query matches any of the titles of the series stores in the video listing module 186.

Step 404—determining a particular document of the plurality of sequentially semantically linked documents, the particular document being one that the user has completed using, the determination that the user has completed using the particular document being executed by means of: determining that the user has reached an end of the particular document; and if the user has not reached the end of the particular document, determining that the user has reached a pre-determined usage threshold within the particular document Next, at step 404, the content server 116 determines the particular document of the plurality of sequentially semantically linked documents, the particular document being one that the user has completed using, the determination that the user has completed using the particular document being executed by means of: determining that the user has reached an end of the particular document; and if the user has not reached the end of the particular document, determining that the user has reached a pre-determined usage threshold within the particular document.

Step 406—generating a suggest to be displayed to the user on the electronic device, the suggest including a sequentially next document after the particular document Next, at step 406, the content server 116 generates a suggest to be displayed to the user on the electronic device, the suggest including a sequentially next document after the particular document.

In some embodiments, the suggest is a first suggest of a list of suggests and if the particular document has not been determined to have been completed (using the hear beat technology, as has been explained above), the method 400 further comprises generating a second suggest being representative of the particular document, the second suggest being ranked above the first suggest.

In some embodiments, the suggest is a first suggest of a list of suggests, the list of suggests further including a second suggest indicative of the particular document that has been determined to have been completed. In the example of the screen shot 500 described above, this can be presented as the previously completed episode 506.

Within some embodiments, the list of suggests further includes the second suggest 508, the second suggest 508 being a second next consequential document after the sequentially next document after the particular document. The list of suggests can also include the third suggest 510, as well as the number of additional suggests 512.

In some embodiments, the method 400 further comprises acquiring the pre-determined usage threshold specifically selected for a type associated with the document. In some embodiments, the pre-determined usage threshold is determined by calculating a heart beat.

The method 400 can further comprise, prior to receiving the user request, determining the heart beat. As been illustrated above and in some embodiments, the step of determining the heart beat comprises: collecting statistical information of the users completing using documents of a type as the plurality of sequentially semantically linked documents; determining one or more time intervals of the users using the document; for each time interval, assigning a probability parameter that after the time interval, the user is deemed to have completed the document; completing, for each time interval, an associated heart beat parameter taking into account the associated probability parameter.

In some embodiments, the heart beat can be personalized for the user and wherein the step of determining the heart beat is executed on statistical information associated with the user.

Within such embodiments, the statistical information is collected off-line.

Within some embodiments, as part of determining heart beat each of time interval is determined by executing the steps of: appreciating a user triggering execution of a particular document; issuing, on a periodic basis, a query to an application executing the particular document, the query requesting the application to confirm is the user is still using the particular document; responsive to the application not confirming that the user is still using the particular document, transmitting to the server an indication of the time interval in association with a user ID.

Within some embodiments, as has been illustrated above, the plurality of sequentially semantically linked documents comprises sequential episodes of a series video content. However, this needs not be so in every embodiment of the present technology. For example, the sequentially semantically linked content can include audio books, other audio content and the like.

The method 400 then terminates.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of processing a user request for a web resource by a server, the method being executed at the server, the method comprising:
   receiving, at the server, the user request from an electronic device via a communication network;
   retrieving the web resource responsive to the user request;
   determining that the web resource comprises a plurality of sequentially semantically linked documents that are potentially responsive to the user request;
   determining a particular document of the plurality of sequentially semantically linked documents, the particular document being one that a user has completed using, the determination that the user has completed using the particular document being executed by means of:
      determining that the user has reached an end of the particular document; and
      if the user has not reached the end of the particular document, determining that the user has reached a pre-determined usage threshold within the particular document, the predetermined threshold being determined by:
         performing a statistical analysis of user viewing patterns,
         using a heart beat algorithm to determine a heart beat based on the statistical analysis, and
         using the heart beat algorithm to determine the predetermined threshold, based at least in part on the heart beat;
   generating a suggestion to be displayed to the user on the electronic device; and
   transmitting, to the electronic device via the communication network, the suggestion and a trigger, the trigger for causing the electronic device to display the suggestion to the user, the suggestion including transmitting a sequentially next document after the particular document,
   wherein the determining that the web resource comprises the plurality of sequentially semantically linked documents comprising:
      acquiring information describing the web resource and the plurality of sequentially semantically linked documents, the information comprising:
         a hash value representing a title,
         a number of seasons,
         number of episodes in each of the seasons, and
         a score associated with each of the documents.

2. The method of claim 1, the suggestion being a first suggestion of a list of suggestions and wherein if the particular document has not been determined to have been completed, the method further comprises generating a second suggestion being representative of the particular document, the second suggestion being ranked above the first suggestion.

3. The method of claim 1, the suggestion being a first suggestion of a list of suggestions, the list of suggestions further including a second suggestion indicative of the particular document that has been determined to have been completed.

4. The method of claim 3, the list of suggestions further including a third suggestion, the third suggestion being a second next consequential document after the sequentially next document after the particular document.

5. The method of claim 1, further comprising acquiring the pre-determined usage threshold specifically selected for a type associated with the document.

6. The method of claim 1, further comprising prior to receiving the user request, determining the heart beat.

7. The method of claim 6, wherein the step of determining the heart beat comprises:
collecting statistical information of the users completing using documents of a type as the plurality of sequentially semantically linked documents;
determining one or more time intervals of the users using the document;
for each time interval, assigning a probability parameter that after the time interval, the user is deemed to have completed the document; and
calculating, for each time interval, an associated heart beat parameter taking into account the associated probability parameter.

8. The method of claim 7, wherein the heart beat is personalized for the user and wherein the step of determining the heart beat is executed on statistical information associated with the user.

9. The method of claim 7, wherein the statistical information is collected off-line.

10. The method of claim 7, wherein each time interval is determined by executing the steps of:
appreciating a user triggering execution of a particular document;
issuing, on a periodic basis, a query to an application executing the particular document, the query requesting the application to confirm is the user is still using the particular document; and
responsive to the application not confirming that the user is still using the particular document, transmitting to the server an indication of the time interval in association with a user ID.

11. The method of claim 1, wherein the score associated with each of the documents is based on a clickability parameter for each of the documents.

12. The method of claim 1, wherein the plurality of sequentially semantically linked documents comprises sequential episodes of a series video content.

13. A server comprising:
a communication interface for communication with an electronic device via a communication network;
a memory storage;
a processor operationally connected with the communication interface and the memory storage, the processor being configured to:
receive, via the communication interface, a user request for a web resource;
determine that the web resource comprises a plurality of sequentially semantically linked documents that are potentially responsive to the user request;
determine a particular document of the plurality of sequentially semantically linked documents, the particular document being one that the user has completed using, the determination that the user has completed using the particular document being executed by means of:
determining that the user has reached an end of the particular document; and
if the user has not reached the end of the particular document, determining that the user has reached a pre-determined usage threshold within the particular document, the predetermined threshold being determined by:
performing a statistical analysis of user viewing patterns,
using a heart beat algorithm to determine a heart beat based on the statistical analysis, and
using the heart beat algorithm to determine the predetermined threshold, based at least in part on the heart beat; and
generate a suggestion to be displayed to the user on the electronic device; and
transmit, to the electronic device via the communication interface, the suggestion and a trigger, the trigger for causing the electronic device to display the suggestion to the user, the suggestion including transmitting a sequentially next document after the particular document,
wherein to determine that the web resource comprises the plurality of sequentially semantically linked documents, the processor is configured to:
acquire information describing the web resource and the plurality of sequentially semantically linked documents, the information comprising:
a hash value representing a title,
a number of seasons,
number of episodes in each of the seasons, and
a score associated with each of the documents.

14. The server of claim 13, the suggestion being a first suggestion of a list of suggestions and wherein if the particular document has not been determined to have been completed, the processor being further configured to generate a second suggestion being representative of the particular document, the second suggestion being ranked above the first suggestion.

15. The server of claim 13, the suggestion being a first suggestion of a list of suggestions, the list of suggestions further including a second suggestion indicative of the particular document that has been determined to have been completed.

16. The server of claim 15, the list of suggestions further including a third suggestion, the third suggestion being a second next consequential document after the sequentially next document after the particular document.

17. The server of claim 13, the processor being further operable to acquire the pre-determined usage threshold specifically selected for a type associated with the document.

18. The server of claim 13, the processor being further operable, prior to receiving the user request, to determine the heart beat.

19. The server of claim 18, wherein to determine the heart beat, the processor is configured to:
collect statistical information of the users completing using documents of a type as the plurality of sequentially semantically linked documents;
determine one or more time intervals of the users using the document;
for each time interval, assign a probability parameter that after the time interval, the user is deemed to have completed the document; and calculate, for each time interval, an associated heart beat parameter taking into account the associated probability parameter.

20. The server of claim 19, wherein the heart beat is personalized for the user and wherein to determine the heart beat, the processor determines the heart beat based on statistical information associated with the user.

21. The server of claim 19, wherein the statistical information is collected off-line.

22. The server of claim 19, wherein the processor is configured to determine each time interval by executing the steps of:
- appreciating a user triggering execution of a particular document;
- issuing, on a periodic basis, a query to an application executing the particular document, the query requesting the application to confirm if the user is still using the particular document; and
- responsive to the application not confirming that the user is still using the particular document, transmitting to the server an indication of the time interval in association with a user ID.

23. The server of claim 13, wherein the score associated with each of the documents is based on a clickability parameter for each of the documents.

24. The server of claim 13, wherein the plurality of sequentially semantically linked documents comprises sequential episodes of a series video content.

* * * * *